No. 739,263. PATENTED SEPT. 15, 1903.
D. T. KENNEY.
SEPARATOR FOR APPARATUS FOR REMOVING DUST.
APPLICATION FILED FEB. 8, 1902.
NO MODEL.
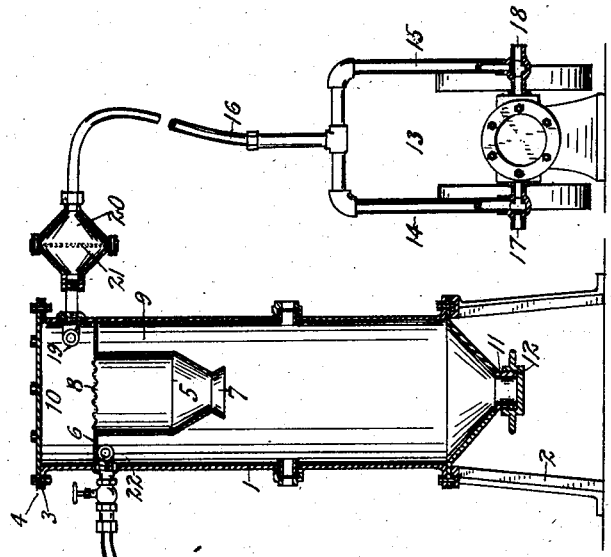
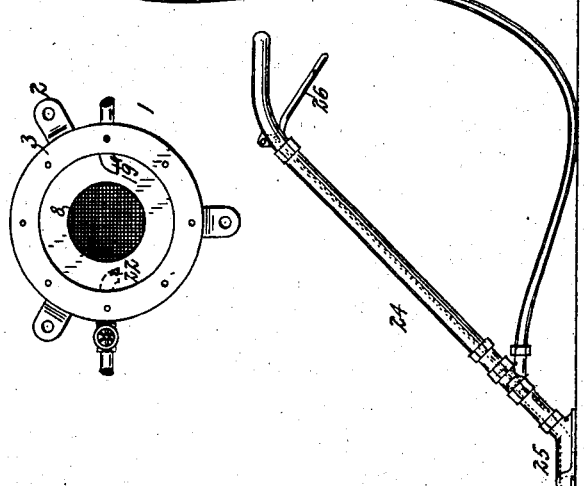
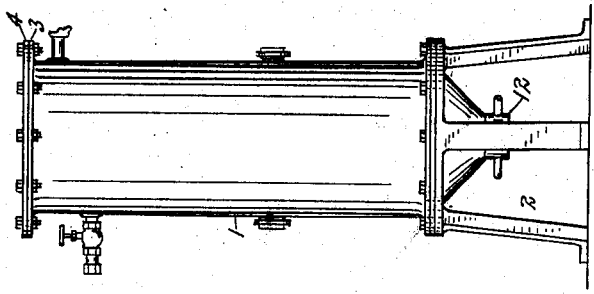
Witnesses:
Edward J. Murphy.
Geo. L. Wheelock.
Inventor:
David T. Kenney
by Thomas Ewing, Jr.,
Attorney.

No. 739,263. Patented September 15, 1903.

UNITED STATES PATENT OFFICE.

DAVID T. KENNEY, OF NORTH PLAINFIELD, NEW JERSEY.

SEPARATOR FOR APPARATUS FOR REMOVING DUST.

SPECIFICATION forming part of Letters Patent No. 739,263, dated September 15, 1903.

Original application filed November 21, 1901, Serial No. 84,058. Divided and this application filed February 8, 1902. Serial No. 93,188. (No model.)

*To all whom it may concern:*

Be it known that I, DAVID T. KENNEY, a citizen of the United States of America, and a resident of the borough of North Plainfield, in the county of Somerset and State of New Jersey, have invented certain new and useful Improvements in Separators for Apparatus for Removing Dust, of which the following is a specification.

This invention relates to separators for apparatus for removing dust, such apparatus being more especially, but not necessarily, adapted for removing dust or dirt from surfaces—such as floors, walls, and ceilings of dwelling-houses, office-buildings, factories, and warehouses—or for removing dust from rooms, chambers, furniture, fixtures, bookcases or shelves, books, clothing, passenger-coaches, sleeping-cars, drawing-room cars, &c.

The object of the invention is to provide a separator for dust-removing apparatus in which the dust is separated from the air in an efficient, reliable, and practical manner.

My invention consists in certain features of construction and combinations of parts to be hereinafter described and then particularly claimed.

In the accompanying sheet of drawings, Figure 1 is a side elevation of my improved separator for dust-removing apparatus. Fig. 2 is a plan view of the same, and Fig. 3 is a side elevation of a form of apparatus or plant for removing dust in which the separator is shown in section.

The separator forming the subject of this application is divided from my application Serial No. 84,058, filed November 21, 1901, and may form a part of the apparatus or plant covered thereby.

Referring to the drawings, a separator is shown consisting of a preferably cylindrical casing or shell 1, which is supported on suitable legs or standards 2 and which is provided with a top flange 3, to which is bolted or otherwise suitably secured a removable top 4. A suitable funnel-shaped baffle 5, serving similarly to a throat and which may be termed a "baffle-throat," is supported in depending position within the upper part of the casing 1 by means of an annular top-supporting flange 6, which is suitably secured, as by riveting or soldering, to the casing 1. The lower portion of the funnel is preferably constructed so as to provide a flaring mouth 7, while across the open upper end of the funnel there is preferably secured a suitable screen 8, made in any suitable manner to provide openings or perforations. An annular space 9 is formed around the funnel, while another space or chamber 10 is formed above the funnel. The bottom of the casing is made to taper downwardly and is provided with a screw-neck 11, to which is applied a suitable screw cap or closure 12, so that dust or dirt which accumulates in the separator may be removed therefrom.

A suction or air pump 13 is arranged at a suitable point and is connected, by means of branch pipes 14 15, with a suction-pipe 16, said branch pipes 14 15 leading to opposite sides of the air-chamber of the pump, so that by the manipulation of suitable valves 17 18 the pump may be utilized either as a suction or as a compression pump. The pipe 16 leads by means of an intake-mouthpiece 19 into the upper chamber 10 of the separator and is provided intermediately of its length with a chamber 20, in which is located a suitable screen 21. The mouthpiece 19 of the suction-pipe 16 is directed laterally, while at the opposite side of the casing and below the flange 6 supporting the funnel is also a laterally-directed outlet-mouthpiece 22 of a flexible tubing or hose 23 or other suitable pipe, which is connected with a hand or equivalent implement 24. With respect to their relation to the closed casing of the separator the opening in the outlet-mouthpiece 22 of the hand implement will be termed an "inlet" and the opening in the intake-mouthpiece 19 of the pump will be termed an "outlet."

The hand implement here shown is one of the forms shown in my copending application referred to. Any suitable form of hand implement provided with a head or shoe 25, which is slotted to admit dust or dirt and in which a valve is arranged which may be controlled by a lever 26, may be used. The passage from the slot of the shoe or head to the flexible tube or pipe 23 is indicated in dotted lines, as is also the valve for controlling the said passage. The form of separator shown is for dry separation in contradistinction to the invention shown and described in my copending application filed on even date herewith, which is a wet separator.

When the pump 13 is operated, so as to create a suction on the apparatus, and an operator, grasping the handle of the hand implement 24, applies the head or shoe to a floor, wall, or ceiling or other surface, the particles of dust or dirt which come within the influence of the suction which is exerted through the slot of the hand implement are sucked through the implement and through the implement hose or pipe 23 without going through the handle, the dust-laden air discharging into the annular space 9 around the funnel 5 of the separator. Suction is exerted on the separator by the mouthpiece 19 of the pump-pipe 18, and in view of the location of the orifices of the mouthpieces 19 22 and also of the relative location of the funnel or baffle-throat 5 a whirling or curvilinear motion is imparted to the air, and as the section of the funnel is of greater area than the opening of the mouthpieces 19 22 the air is rarefied in the separator, so that the dust or other particles becomes relatively heavier. As the whirling or curvilinear motion imparted to the air within the large chamber of the separator lengthens out the path of the air-current, as it were, this, in connection with the fact that the air in the casing of the separator is rarefied and the suction action is less therein than in the pump-pipe, permits practically all the dust suspended in the dust-laden air sucked through the outlet-mouthpiece 22 of implement-pipe 23 to gravitate and drop onto the bottom of the separator, the suction through the enlarged orifice 7 of the funnel not being sufficient to overcome the gravitating tendency of the dust particles. As a further guard against the sucking of any particles of dust through the intake-mouthpiece 19 the screen 8 at the upper end of the funnel is preferably provided. Should, however, any particles find access into the intake-mouthpiece 19, they will be intercepted by the screen 21. The air discharged from the pump is directed to any suitable point. When the casing is filled with dust or dirt to a practicable point, the action of the pump is interrupted and the screw-cap 12 of the separator removed. The dust and dirt may be discharged therefrom, as from a hopper, into a suitable receptacle. After this has been done the screw-cap is replaced and the action of the apparatus is resumed. By reversing the action of the pump 13 air may be forced through the apparatus, so as to clean the screens 21 8 from adhering particles.

The particular construction of hand implement is not claimed herein, as the same forms the subject-matter of my said original application, Serial No. 84,058, and of my other applications, Serial No. 93,189, filed February 8, 1902, and Serial No. 147,968, filed March 16, 1903.

What I claim as new and of my invention is—

1. A separator for a dust-removing apparatus, said separator consisting of a casing, a baffle-throat, a flange closing the space between the upper end of the baffle-throat and the casing, an air-inlet at one side of the flange and an air-outlet from the casing at the other side of the flange, in combination with a suction-pump connected with the outlet to produce a partial vacuum in the casing, substantially as described.

2. A separator for a dust-removing apparatus, said separator consisting of a vertical cylindrical casing, a concentrically-arranged baffle-throat in the casing, a flange closing the space between the upper end of the baffle-throat and the casing, a tangentially-directed air-inlet below the flange and between the casing and baffle-throat, and an air-outlet from the casing above the flange, in combination with a suction-pump connected with the outlet to produce a partial vacuum in the casing, substantially as described.

Signed at New York city, borough of Manhattan, this 6th day of February, 1902.

DAVID T. KENNEY.

Witnesses:
GEORGE H. GILMAN,
GEO. L. WHEELOCK.